United States Patent [19]

Osanai et al.

[11] Patent Number: 4,735,112

[45] Date of Patent: Apr. 5, 1988

[54] APPARATUS FOR CONTROLLING CONTINUOUSLY VARIABLE TRANSMISSION

[75] Inventors: Akinori Osanai; Takao Niwa; Takeshi Gono, all of Susono, Japan

[73] Assignee: Toyota Jidosha Kabushiki Kaisha, Toyota, Japan

[21] Appl. No.: 925,532

[22] Filed: Oct. 28, 1986

Related U.S. Application Data

[63] Continuation of Ser. No. 629,563, Jul. 10, 1984, abandoned.

[30] Foreign Application Priority Data

Aug. 22, 1983 [JP] Japan .................. 58-151729

[51] Int. Cl.$^4$ .................................... B60K 41/12
[52] U.S. Cl. .................................... 74/866; 74/865
[58] Field of Search .................. 74/861, 862, 865, 866, 74/877

[56] References Cited

U.S. PATENT DOCUMENTS

| | | | |
|---|---|---|---|
| 4,161,894 | 7/1979 | Giacosa | 474/12 |
| 4,291,594 | 9/1981 | Baudoin | 74/877 X |
| 4,342,298 | 8/1982 | Ganoung | 74/877 X |
| 4,383,456 | 5/1983 | Ganoung | 74/877 X |
| 4,458,318 | 7/1984 | Smit et al. | 74/866 |
| 4,458,560 | 7/1984 | Frank et al. | 74/877 X |
| 4,459,878 | 7/1984 | Frank | 74/877 X |
| 4,481,844 | 11/1984 | Ironside et al. | 74/866 |
| 4,507,986 | 4/1985 | Okamura et al. | 74/866 |
| 4,515,040 | 5/1985 | Takeuchi et al. | 74/866 |
| 4,515,041 | 5/1985 | Frank et al. | 74/866 |
| 4,536,171 | 8/1985 | Tanaka et al. | 74/866 |
| 4,546,673 | 10/1985 | Shigematsu et al. | 74/866 |
| 4,589,071 | 5/1986 | Yamamuro et al. | 74/866 X |
| 4,590,561 | 5/1986 | Abo et al. | 74/866 X |
| 4,597,308 | 7/1986 | Tanaka et al. | 74/866 |

FOREIGN PATENT DOCUMENTS 0090450  6/1982  Japan ..................... 474/11

*Primary Examiner*—Leslie Braun
*Assistant Examiner*—David Novais
*Attorney, Agent, or Firm*—Oblon, Fisher, Spivak, McClelland & Maier

[57] ABSTRACT

A continuously variable transmission (CVT) used in a vehicle is controlled such that an actual engine speed Ne is equalized to a desired engine speed Ne'. A reference engine speed Ner is defined to be nearly equal to and less than Ne'. When Ne<Ner, or Ne>Ne', the speed ratio e of the CVT is allowed to be changed, while the change is inhibited when Ner≦Ne<Ne'.

4 Claims, 5 Drawing Sheets

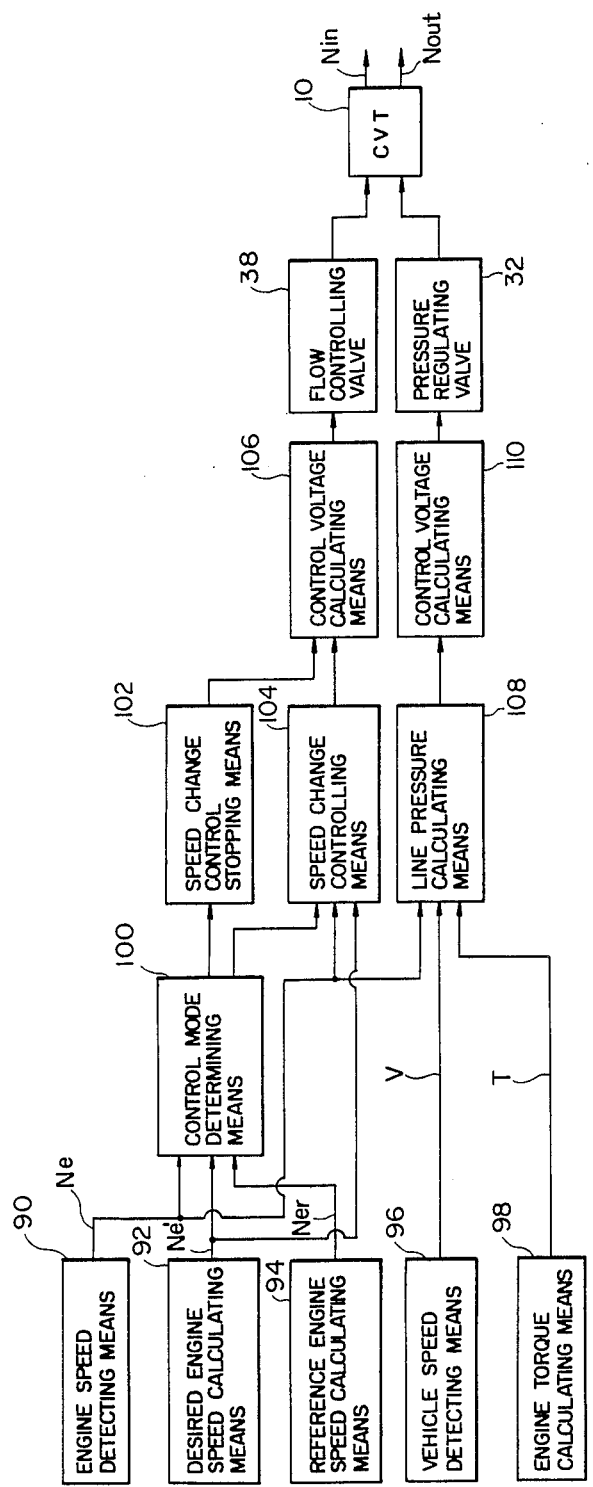

APPARATUS FOR CONTROLLING CONTINUOUSLY VARIABLE TRANSMISSION

This applicaiton is a continuation of application Ser. No. 629,563, filed July 10, 1984, abandoned.

BACKGROUND OF THE INVENTION

1. Field of the Invention

The present invention relates to an apparatus for controlling a continuously variable transmission (CVT) used in a vehicle.

2. Description of the Prior Art

A CVT capable of continuously controlling a speed a ratio e(=output side rotational speed/input side rotational speed) is used in a vehicle for a power transmission unit with an excellent specific fuel consumption. A desired engine speed Ne' is set as an engine speed to achieve an output horse power of the engine set as a function of a pedalling amount of an accelerator pedal for example with a minimum fuel consumption, and the CVT is controlled such that an actual engine speed Ne is equalized to the desired engine speed Ne'. In the prior method of controlling the CVT, the speed change of the CVT, i.e. the alteration in the speed ratio e is always effected when there is some deviation between Ne and Ne', while the transmission loss of the CVT is so large during the speed change that drive torque is disadvantageously transmitted. Also, when the actual engine speed Ne is increased to the desired engine speed Ne' in acceleration of a vehicle, it is advantageous from a view point of the specific fuel consumption to fix the speed ratio e for avoiding the increase of the engine output from being absorbed by moment of inertia and accelerate the vehicle with the low engine speed for proper acceleration.

SUMMARY OF THE INVENTION

An object of the present invention is to provide an apparatus for controlling a CVT having an advantageous specific fuel consumption and acceleration of a vehicle.

According to the present invention to achieve this object, in the apparatus for controlling the CVT for a vehicle such that an actual engine speed Ne is equalized to a desired engine speed Ne', the reference engine speed Ner is set to a value lower than the desired engine speed Ne', and the actual engine speed Ne is compared with the desired engine speed Ne' and the reference engine speed Ner to allow the speed change of the CVT when Ne<Ner and Ne>Ne' and fix the speed ratio e of the CVT when Ner≦Ne<FNe'.

When a proper or necessary and sufficient acceleration is obtained rather by fixing the speed ratio e, the relationship of Ner≦Ne<Ne' is established so that the speed ratio e is fixed and the vehicle speed is increased only by the increase of the engine speed Ne and thereby the transmission loss due to the speed change is to be avoided while a satisfactory acceleration is to be obtained. Also, when the fixation of the speed ratio e is disadvantageous, the relationship of Ne<Ner and Ne>Ne' is established, so that the speed change is allowed to provide a ready and proper acceleration in this case.

In a preferred embodiment, the desired engine speed Ne' and the reference engine speed Ner are set as functions of a throttle position θ. The reference engine speed Ner as the criterion of whether or not the speed ratio e should be fixed is to be set according to the throttle position θ to carry out an accurate judgement.

Further preferably, the reference engine speed Ner is to be a function of the throttle position θ and a vehicle speed V to carry out more accurately the judgement.

The accompanying drawings, which are incorporated in and constitute part of this specification, illustrate embodiments of the present invention and, together with the description, serve to explain the principle of the present invention.

BRIEF DESCRIPTION THE DRAWINGS

FIG. 1 a schematic view showing a whole CVT to which the present invention is applied;

FIG. 4 is a graph showing the relationship between a throttle position and a desired engine speed or the like;

FIG. 6 is a block diagram showing the function of the present invention.

DETAILED DESCRIPTION OF PREFERRED EMBODIMENTS

Figure 1:
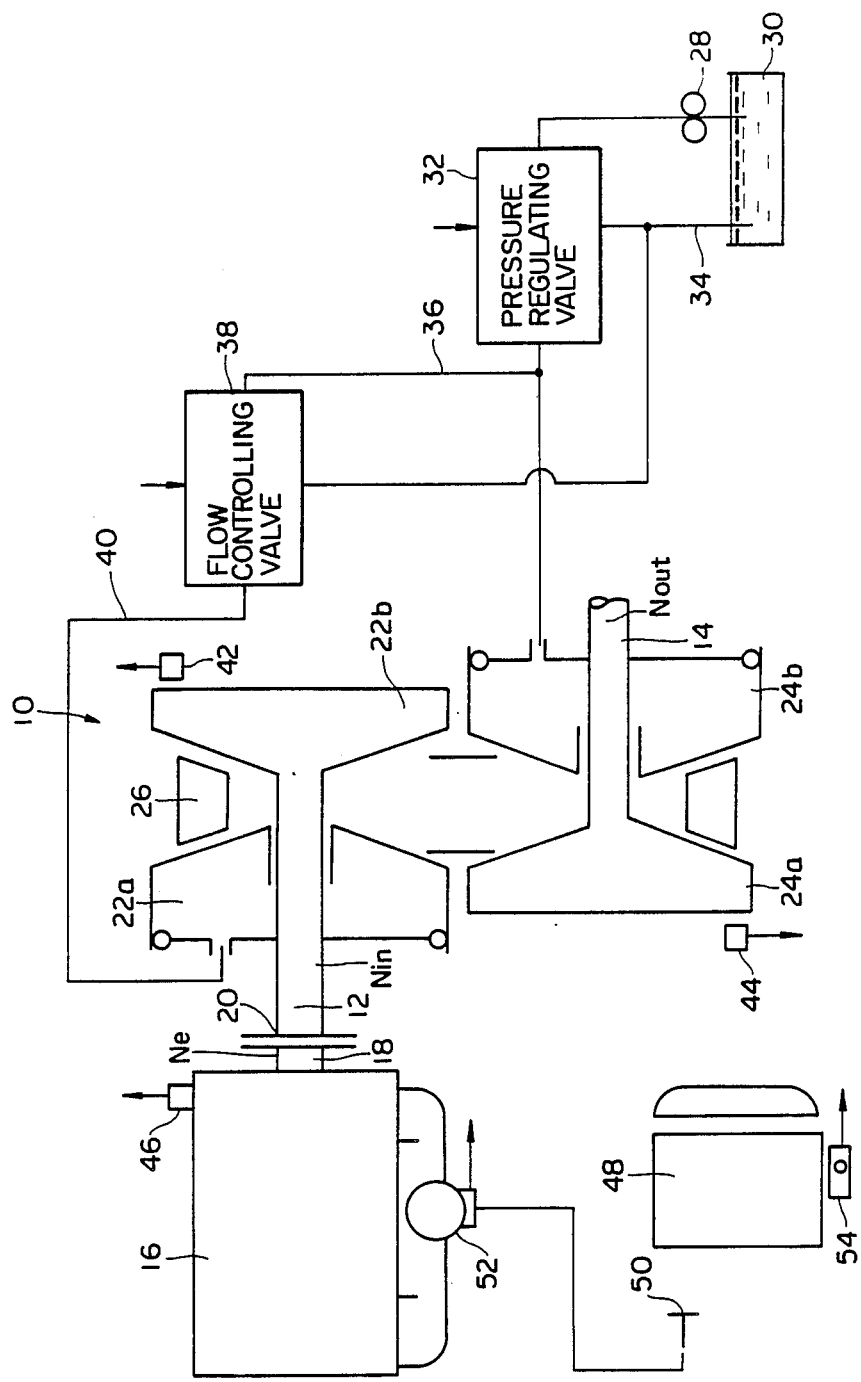

In FIG. 1, a CVT 10 is provided with an input shaft 12 and an output shaft 14 parallel to each other. The input shaft 12 is provided coaxially with a crankshaft 18 of an engine 16 and connected to the crankshaft 18 through a clutch 20 input side pulleys 22a, 22b are provided opposed to each other, one input side pulley 22a being provided on the input shaft 12 to be moved axially as a movable pulley and fixed rotationally and the other input side pulley 22b being fixed to the input shaft 12 as a fixed pulley. Similarly, output side pulleys 24a, 24b are provided opposed to each other, one output side pulley 24a being fixed to the output shaft 14 as a fixed pulley and the other output side pulley 24b being provided on the output shaft 14 to be moved axially as a movable pulley and fixed rotationally. The opposed surfaces of the input and output side pulleys 22a, 22b and 24a, 24b are formed tapered and a belt 26 having an equilateral trapezoidal section is trained over the input and output side pulleys 22a, 22b and 24a, 24b. An oil pump 28 sends oil in an oil reservoir 30 to a pressure regulating valve 32. The pressure regulating valve 32 controls line pressure in an oil path 36 by varying the escaping amount of oil to a drain 34, and the line pressure in the oil path 36 is sent to a hydraulic cylinder and a flow controlling valve 38 of the output side pulley 24b. The flow controlling valve 38 controls oil flow supplied from the oil path 36 to an oil path 40 connected to the hydraulic cylinder of the input side disk 22a and oil flow drained from the oil path 40 to the drain 34. Press forces of the input and output side pulleys 22a, 22b and 24a, 24b against the belt 26 is controlled by hydraulic pressure in the input and output side hydraulic cylinders to vary the engaging radii of the belt 26 on the tapered surfaces of the input and output side pulleys 22a, 22b and 24a, 24b in relation to the press force so that the speed ratio e of the CVT 10 (=Nout/Nin, where Nout is the rotational speed of the output shaft 14 and Nin is the rotational speed of the input shaft 12, in this embodiment, Nin=engine speed Ne) is varied. The line pressure in the output side hydraulic cylinder is controlled to the necessary minimum value to avoid the slip of the belt 26 and ensure the power transmission for restraining the drive loss of the oil pump 28 so that the speed ratio e is controlled by oil pressure in the input side hydraulic cylinder. Further, while the oil pressure in the input side hydraulic cylinder ≦ the oil pressure in the output side hydraulic cylinder, the press forces of the input side pulleys 22a, 22b are to be larger than that of the output side pulleys 24a, 24b since the pressure receiving area of the input side hydraulic cylinder is larger than that of the output side hydraulic cylinder. Input and output side rotational angle sensors 42 and 44 detect respectively the rotational speeds Nin, Nout of the input and output shafts 12 and 14, and a water temperature sensor 46 detects cooling water temperature in the engine 16. An accelerator pedal 50 is provided in a driver's seat 48 and interlocked with a throttle valve in an intake path and a throttle position sensor 52 detects throttle position 8. A shaft position sensor 54 detects the shift range of a shift lever near the driver's seat.

Figure 2:
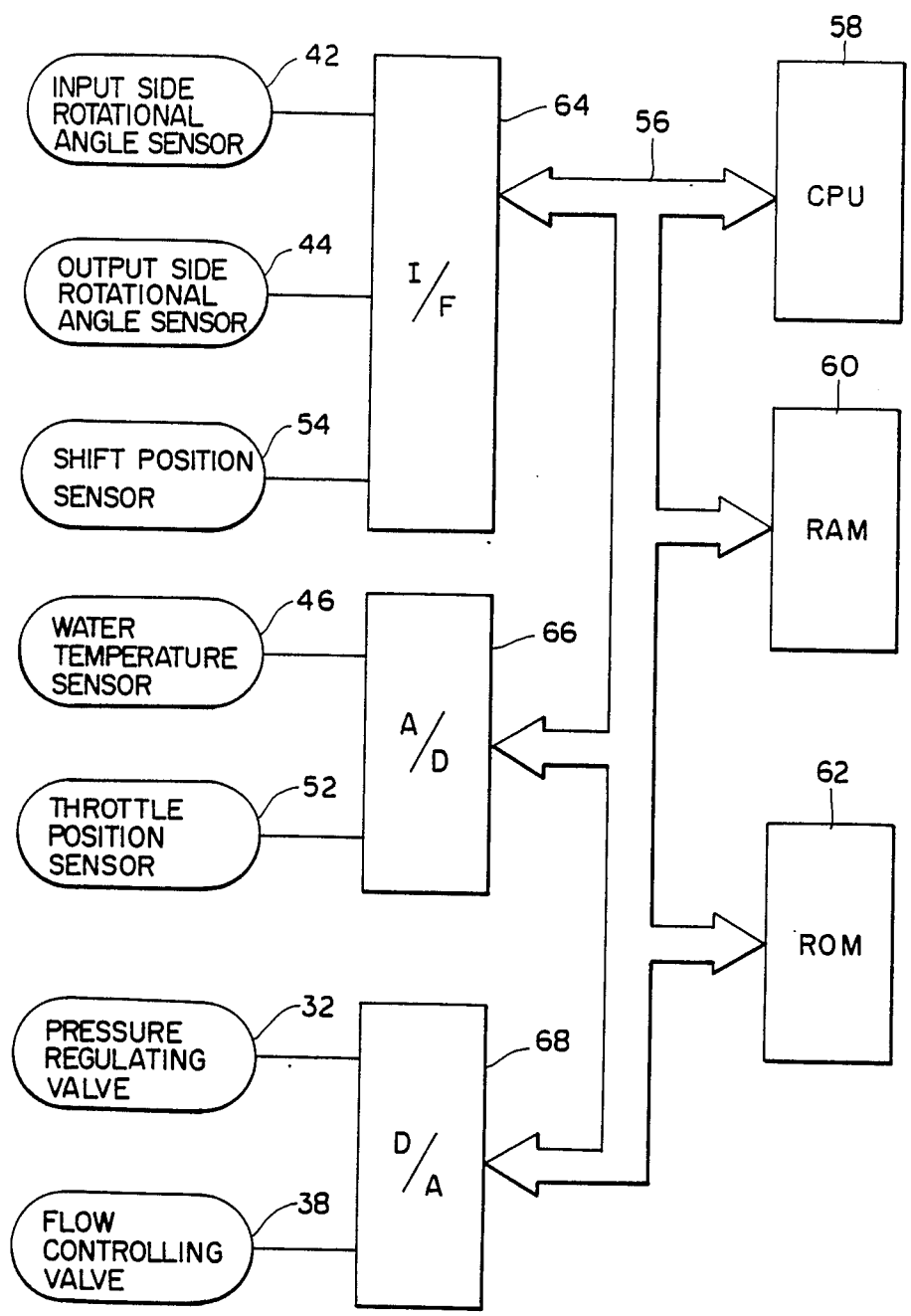
FIG. 2 is a block diagram showing an electronic control unit.

FIG. 2 is a block diagram showing an electronic control unit. CPU 58, RAM 60, ROM 62, I/F (interface) 64, A/D (analog/digital converter) 66 and D/A (digital/analog converter) 68 are interconnected through an address data bus 56. The I/F 64 receives pulse signals from the input side rotational angle sensor 42, the output side rotational angle sensor 44 and the shift position sensor 54. The A/D 66 receives analog signals from the water temperature sensor 46 and the throttle position sensor 52, and the D/A 66 generates output pulses to the pressure regulating valve 32 and the flow controlling valve 38.

Figure 3:
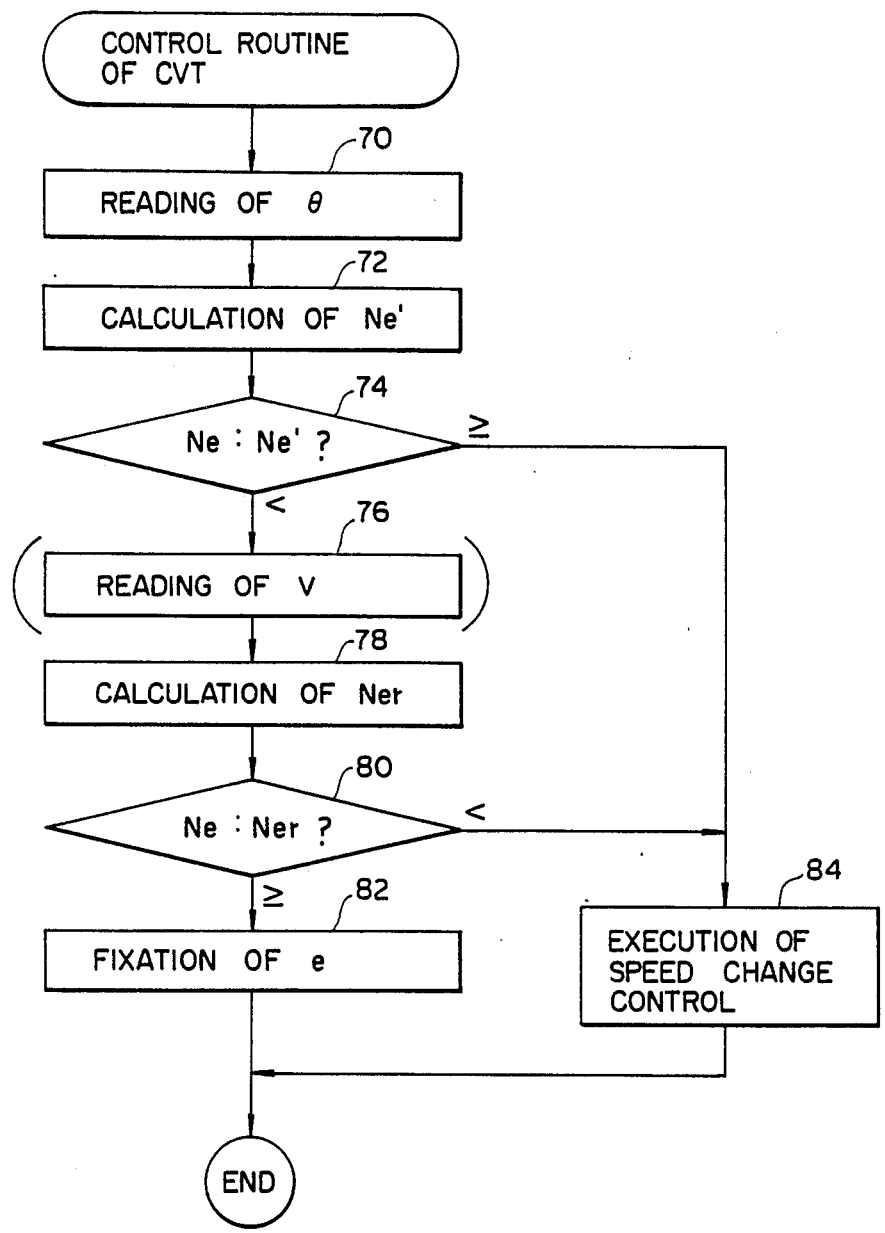
FIG. 3 is a flow chart showing a control routine of the CVT.
Figure 4:
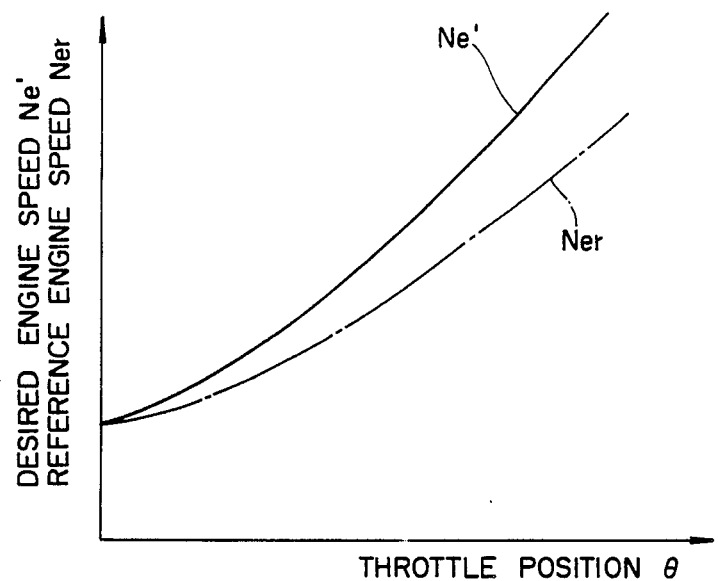
Figure 5:
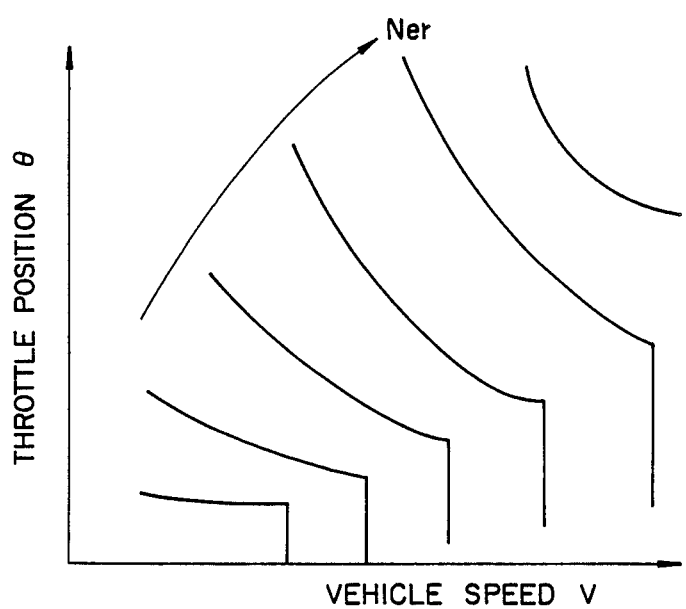
FIG. 5 is a graph showing the relationship between a throttle position, vehicle speed and a reference engine speed.

FIG. 3 is a flow chart showing a control routine of the CVT. As shown in FIG. 4, the desired engine speed Ne' and the reference engine speed Ner are set as a function of the throttle position $\theta$ and the speed change is controlled such that the speed ratio e is fixed when the actual engine speed Ne is within the range of Ner≦Ne<Ne' and Ne equals Ne' when the Ne is in the other range. Ner is defined as the engine speed smaller than Ne' and set as a minimum engine speed to give satisfactory or necessary and sufficient acceleration rather by fixing the speed ratio e to accelerate the vehicle only by increasing the engine speed Ne. Since the speed ratio e is fixed in the case of Ner≦Ne<Ne', the transmission loss of the CVT 10 is restrained and the specific fuel consumption is to be improved. When the vehicle speed V is low even with the same throttle position $\theta$, satisfactory acceleration is obtained rather by fixing the speed ratio e to improve the efficiency of transmission of the CVT and ensure torque, so that it is more advantageous to set the reference engine speed Ner as a function of the throttle position $\theta$ and the vehicle speed V as shown in FIG. 5. Referring particularly to each step in FIG. 3, in step 70 is read the throttle position $\theta$. In step 72 is calculated the desired engine speed Ne' from the throttle position $\theta$. In step 74 is the actual engine speed Ne compared with the desired engine speed Ne' and advance is made to step 76 if Ne<Ne' and to step 84 if Ne≦Ne' respectively. In step 76 is detected the vehicle speed V.

As shown in FIG. 4, when the reference engine speed Ner is set as a function of the throttle position $\theta$ along, steps 76 is omitted. In step 78 is calculated the reference engine speed Ner from the throttle position $\theta$ (and vehicle speed V). In step 80 is compared Ne with Ner and advance is made to step 84 if Ne<Ner and to step 82 if Ne≧Ner respectively. In step 82 is fixed the speed ratio e and thereby the vehicle speed V is increased only by increasing the engine speed Ne. In step 84 is controlled the speed change to provide Ne=Ne' (alteration of speed ratio e).

FIG. 6 is a block diagram showing a function of the present invention. An engine speed detecting means 90 detects the engine speed Ne, a desired engine speed calculating means 92 calculates the desired engine speed Ne', a reference engine speed calculating means 94 calculates the reference engine speed Ner, a vehicle speed detecting means 96 detects the vehicle speed V and an engine torque calculating means 98 calculates engine torque T. The engine torque T is to be calculated as functions of the throttle position $\theta$ and the engine speed Ne. A control mode determining means 100 judges whether or not Ner≦Ne<Ne' and if it is positive the speed ratio e is fixed by a speed change control stopping means 102 and if it is negative, the speed ratio e is varied by a speed change controlling means 104. A control voltage calculating means 106 calculates control voltage corresponding to the speed ratio e and sent from the speed change control stopping means 102 or the speed change controlling means 104 to drive the flow controlling valve 38 on the basis of this control voltage. A line pressure calculating means 108 calculates the necessary minimum line pressure from the vehicle speed V and the engine torque T. A control voltage calculating means 110 calculates the control voltage corresponding to the line pressure to drive the pressure regulating valve 32 on the basis of this control voltage.

It will be apparent to those skilled in the art that various modifications and variations may be made in the elements of the invention without departing from the scope or spirit of the invention.

What is claimed is:

1. A continuously variable transmission for a vehicle provided with an internal combustion engine, which engine has a throttle valve, said transmission comprising:

transmission means arranged between the engine and the vehicle for obtaining a continuously changeable speed ratio;

means for controlling a speed ratio of the transmission means;

means for storing a desired engine speed versus positions of the throttle valve for providing the minimum fuel consumption;

means for detecting an actual position of the throttle valve;

calculating means for calculating, by using the storing means, a desired engine speed value corresponding to the detected throttle position;

means for providing an area of the engine speed determined for every throttle opening, which area is slightly lower than the desired engine speed although capable of providing sufficient power to attain a smooth acceleration even if the speed ratio is fixed, due to the absence of transmission loss;

means for detecting an actual engine speed;

means for providing a signal issued to the speed ratio controlling means for obtaining a fixed speed ratio so that the actual engine speed is controlled toward the desired engine speed when the actual engine speed is in said area; and means for providing a signal issued to the speed ratio controlling means for varying the speed ratio so that the actual engine speed is controlled toward the desired engine speed when the actual engine speed is in an area other than said area.

2. A continuously variable transmission according to claim 1, wherein said area is defined by the desired engine speed $Ne'$ for providing minimum fuel consumption with regard to a degree of throttle opening and a reference engine speed $Ner$ which is slightly lower than said desired engine speed $Ne'$.

3. A continuously variable transmission (CVT) as defined in claim 2, wherein the desired engine speed $Ne'$ and the reference engine speed $Ner$ are set as a function of the throttle position $\theta$.

4. A continuously variable transmission (CVT) as defined in claim 3, wherein the reference engine speed $Ner$ is a function of the vehicle speed $V$.

* * * * *